United States Patent
Schuler

(10) Patent No.: US 6,896,473 B2
(45) Date of Patent: May 24, 2005

(54) DEVICE FOR TRANSMITTING TORQUE

(75) Inventor: Hans Andrea Schuler, Schaffhausen (CH)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/232,220

(22) Filed: Aug. 30, 2002

(65) Prior Publication Data

US 2003/0064816 A1 Apr. 3, 2003

(30) Foreign Application Priority Data

Sep. 17, 2001 (CH) .............................................. 1709/01

(51) Int. Cl.⁷ ............................. B66C 1/00; F16D 3/04; F16B 7/10
(52) U.S. Cl. .................... 414/729; 464/162; 403/109.1; 403/109.7; 403/389; 403/396; 901/28; 901/29; 74/551.1; 74/551.3; 74/551.8
(58) Field of Search ................................ 464/102, 104, 464/162; 74/551.1, 551.3, 551.8, 492; 414/729; 901/28, 29; 403/389, 393, 396, 162, 109.1, 109.7

(56) References Cited

U.S. PATENT DOCUMENTS 4,307,629 A * 12/1981 Moller ....................... 475/255
6,635,062 B2 * 10/2003 Ray et al. ..................... 606/96

FOREIGN PATENT DOCUMENTS

| EP | 0 250 470 B1 | 12/1986 | |
|---|---|---|---|
| EP | 0 747 605 A1 | 4/1996 | |
| EP | 1 129 829 A1 | 2/2001 | |
| GB | 0881355 | * 11/1961 | ................. 464/162 |
| WO | WO 99/67066 | 6/1999 | |
| WO | WO 00/35640 | 12/1999 | |
| WO | WO 01/60571 A1 | 8/2001 | |

OTHER PUBLICATIONS

Beer, Vector Mechanics for Engineers Dynamics 1996, McGraw–Hill, 6th edition, pp. 889–890.*

Swiss Search Report.

* cited by examiner

Primary Examiner—Daniel P. Stodola
Assistant Examiner—Victor MacArthur
(74) Attorney, Agent, or Firm—Harness, Dickey & Pierce, P.L.C.

(57) ABSTRACT

A changeable-length fourth axis of a delta robot has a first bar (82) and a second bar (83), which can be displaced parallel to one another in a slide bearing (84, 85). They are connected to articulation heads (80, 81) for leading in an incoming torque and for leading out an outgoing torque. The first and second bars (82, 83) are arranged here such that the incoming torque runs in a direction which is parallel to, but offset from, the direction of the outgoing torque. This fourth axis allows precise torque transmission, but is nevertheless of straightforward construction, has a high bending strength and relatively low weight and can easily be cleaned by being washed down.

16 Claims, 3 Drawing Sheets

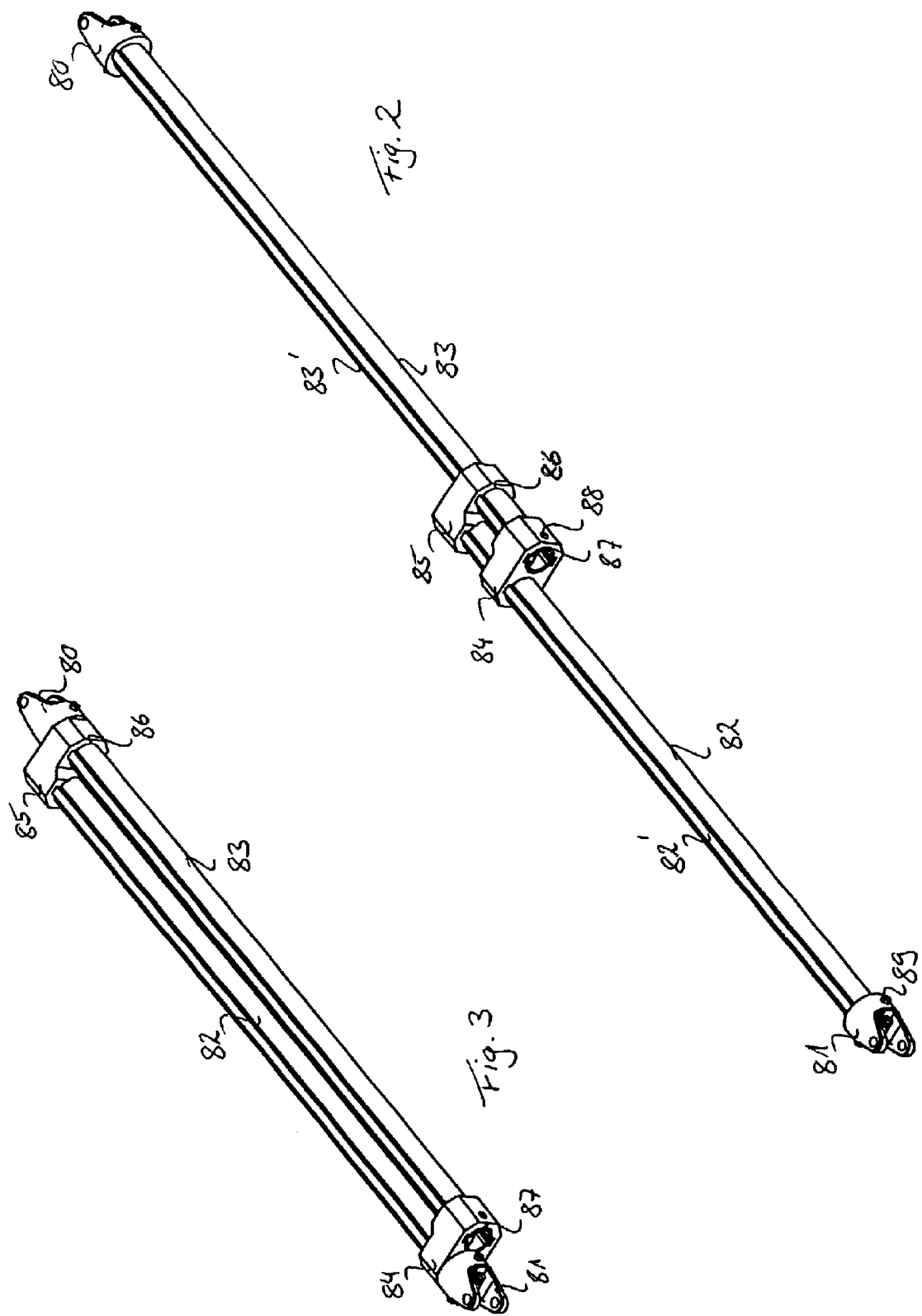

DEVICE FOR TRANSMITTING TORQUE

TECHNICAL FIELD

The invention relates to a device for transmitting torques. The device is suitable, in particular, as an adjustable-length fourth axis of a robot operating by the delta principle.

PRIOR ART

WO 00/35640, EP-A-1,129,829 and EP-A-0,250,470 disclose such devices. The latter are used in a robot which operates by the so-called delta principle. This delta robot is suitable for moving an object in a precise and guided manner in three dimensions. The robot has a basic element and a moveable carrier element, on which gripping means adapted to the respective application area are arranged. Three motor-driven, moveable control arms and a motor-driven telescopic axle are connected, at their opposite ends, to the basic element and the carrier element. The control arms move the carrier element and also bear most of the weight. The telescopic axle, also referred to as the fourth axis, is connected to the gripping means. With the aid of said fourth axis, the gripping means can be rotated about an axis. The fourth axis thus serves as a device for transmitting torques and angles of rotation from the motor to the gripping means. This transmission has to take place very precisely, but should nevertheless be capable of being carried out in three dimensions. The fourth axis is thus designed as a telescope with two tubes arranged concentrically one inside the other. Displacing the tubes relative to one another makes it possible to vary the distance between the basic element and the carrier element. Typical displacement speeds of the telescope here are around 10 m/s.

WO 99/67066 also describes a robot with a changeable-length arm, which can nevertheless be pivoted about two axes. The arm can be displaced in a rotationally fixed manner in a bearing.

Furthermore, EP-A-0,046,531 discloses a telescopic rail which is constructed in three parts. Two outer rails are synchronized with one another by a roller which is mounted in a non-displaceable manner relative to an inner rail. The roller butts directly against one of the outer rails and acts on the other outer rail by way of its running surface. The three rails may be arranged one beside the other.

These telescopic axles or rails according to the prior art have the disadvantage that they are only moderately suitable for so-called wash-down designs. These designs should be capable of being cleaned as easily as possible without individual parts having to be dismantled. This requirement has to be fulfilled, in particular, when such robots are used in the foodstuffs sector or in other sectors where hygiene is an issue. The concentrically displaceable tubes, however, mean that complete cleaning is not possible.

WO 01/60571 discloses a delta robot with a telescopic fourth axis which is intended to be easy to clean. The telescopic arms comprise a plurality of tubes which are arranged parallel to one another and are mounted in a common plate at the two ends. In each case one plate here has the tubes of the other telescopic arm passing through it with sliding action. The direction of the incoming torque is thus identical to the direction of the outgoing torque. This device has the disadvantage that it is of relatively complicated construction and is correspondingly heavy. In addition, the multiplicity of bars, as before, makes cleaning more difficult.

DESCRIPTION OF THE INVENTION

It is therefore an object of the invention to provide a device for transmitting torques, in particular for delta robots, which allows improved cleaning and has an optimum force flux and a high level of rigidity.

This object is achieved by a device having the features of patent claim 1.

The device according to the invention comprises at least two bars which can be displaced parallel to one another in a guided manner in slide bearings to form a changeable-length axle and are connected to articulation heads for leading in an incoming torque and for leading out an outgoing torque. The bars are arranged here such that an incoming torque is a applied to the first articulation head and the second articulation head transmits the torque as an outgoing torque.

This allows a parallel but offset arrangement of the bars, which can nevertheless be changed in length. The parallel but offset arrangement easily makes it possible for the bars to be completely cleaned by the wash-down principle, that is to say without being dismantled.

The parallel but offset arrangement makes it possible, in addition, to use relatively short slide bearings. This minimizes dead spaces, that is to say regions which are not directly accessible and are thus difficult to clean.

The parallel but offset arrangement additionally makes it possible for the bars to be of straightforward shapes, with the result that their surfaces can easily be cleaned.

In a straightforward embodiment, the device comprises two bars, two slide-bearing elements and two articulation heads. This small number of parts, in turn, makes cleaning easier. In addition, it is also the case, however, that the weight is reduced, which has a positive effect, in particular, on the performance of the robot. Furthermore, the production costs are minimized, in particular if the bars and slide-bearing elements are of identical design in each case.

If the bars are mounted in a rotationally fixed manner, then the incoming torque is transmitted to the bearing element purely as torsion. Bending torsion with a large proportion of torsion is produced in the central part. Only torsion is present in the region of the outgoing torque. The device according to the invention thus reduces the bending stress of the bars. Since tubes and bars are always weaker in respect of bending than in respect of torsion, the force flux is optimized. The device has high rigidity values.

Further advantageous embodiments can be gathered from the dependent patent claims.

This device is suitable as a fourth axis for the delta robot mentioned in the introduction. However, other application areas in which a torque has to be transmitted precisely are possible.

BRIEF DESCRIPTION OF THE DRAWINGS

The subject matter of the invention is explained hereinbelow with reference to a preferred exemplary embodiment, which is illustrated in the attached drawing, in which:

FIG. 2 shows a perspective illustration of a device according to the invention in the fully extended state;

FIG. 3 shows an illustration of the device according to FIG. 2 in the retracted state;

METHODS OF IMPLEMENTING THE INVENTION

Figure 1:
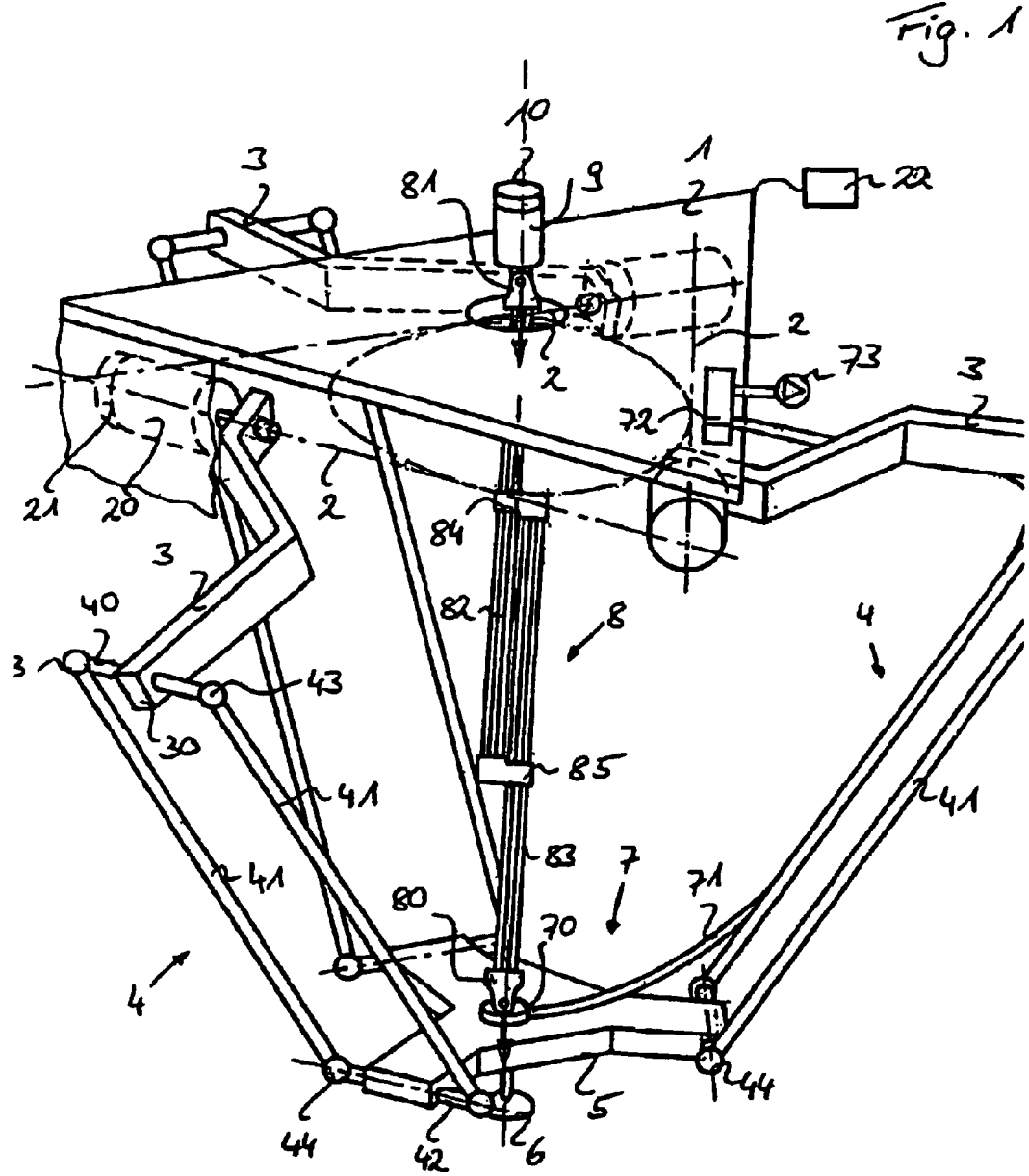
FIG. 1 shows a perspective illustration of a delta robot with the device according to the invention.

FIG. 1 illustrates a delta robot. Apart from a fourth axis which has been changed according to the invention, it corresponds to the delta robot mentioned in the introduction. It is thus only briefly described hereinbelow.

The robot has a plate-like basic element 1 on which three axes 2 are mounted in a rotatable manner. The axes 2 are driven by servomotors 20, which are each connected to an angle transmitter 21. The servomotors 20 are connected to a common monitoring and control unit 22.

The axes 2 are arranged in a common surface and together form a triangle. Fastened on each axis 2 is a control arm 3, which can be moved with the axis 2. Each control arm 3 has a free end 30, which is connected in an articulated manner to a connecting element 4. For this purpose, the free end 30 has a top transverse rod 40 passing through it, said rod being retained in a fixed manner therein. The top transverse rod 40 is connected to two connecting rods 41 via top articulation heads 43. The connecting rods 41 are fitted at two ends of a bottom transverse rod 42 via bottom articulation heads 44. This bottom transverse rod 42 is arranged in a fixed position in a carrier element 5, its two ends passing through the latter.

The carrier element 5 is thus borne by means of these control arms 3 and can be moved in three dimensions thereby. The carrier element 5 is of plate-like design. A gripping element 6 is arranged in its center and on its underside. The type of gripping element 6 depends on the area of use. By means of this gripping element 6, the robot grips a product and transports it to a desired location. In the example illustrated, the gripping element is a suction cup.

In the example illustrated here, the gripping element 6 is provided with a pneumatic suction apparatus 7. Arranged on the carrier element 5 is a connecting ring 70, which is connected to the suction cup on the one hand and to a hose 71 on the other hand. The hose 71 is connected to a valve 72 and a vacuum pump 73.

The delta robot has a changeable-length fourth axis 8. This fourth axis 8 forms the device for transmitting torques, an incoming torque in the region of the basic element 1 being converted into an outgoing torque in the region of the moveable carrier element 5.

The fourth axis 8 is arranged between the basic element 1 and the carrier element 5, and passes through an opening in the basic element 1. It is connected to the shaft of gripping element 6 at one end via a bottom articulation, in this case a cardan joint 80. It is also connected to a shaft of a servomotor 9 at a second end via a top articulation, in this case likewise a cardan joint 81. Said servomotor 9, in turn, is provided with an angle transmitter 10. The fourth axis 8 serves, as has already been mentioned in the introduction, for rotating the gripping element 6 in three dimensions.

The fourth axis 8 according to the invention is illustrated more precisely in FIGS. 2 to 4. It has a plurality of, in this case two, bars 82, 83. The bars 82, 83 can be displaced parallel to one another in a guided manner in a slide bearing 84, 85 to form a changeable-length axle. The bars 82, 83 are arranged so that an incoming torque is applied to the first articulation head and the second articulation head transmits the torque as an outgoing torque.

This is achieved in the example illustrated here in that the slide bearing 84, 85 is of rotationally fixed design, with the result that the incoming torque 11 is transmitted from the first, top bar 82, via the slide bearing 84, 85, to the second, bottom bar 83.

The slide bearing comprises a plurality of, in this case two, slide-bearing elements 84, 85. Each slide-bearing element 84, 85 has a through-passage opening 86 and an accommodating opening 87. Each through-passage opening 86 has in each case one of the two bars 82, 83 passing through it. For example, the first bar 82 passes through the through-passage opening 86 of the first slide-bearing element 84 and the second bar 83 passes through that of the second slide-bearing element 85. The end of the other bar in each case is retained in a rotationally fixed and non-displaceable manner in the accommodating openings 87, that is to say the end of the first bar 82 is arranged in the accommodating opening 87 of the second slide-bearing element 85. Fixing takes place here, for example, by means of first screws 88. This arrangement makes it possible for the bars 82, 83 to be displaced within the associated slide-bearing elements 84, 85, as can be seen in FIGS. 2 and 3.

Parts of the cardan joints 80, 81 are fitted in a rotationally fixed manner at the free ends of the bars 82, 83 in order to form the top and bottom articulations. This also preferably takes place by means of second screws 89.

In the example illustrated here, the bars 82, 83 are designed as tubes. They are preferably produced from aluminum or a fiber-reinforced plastic. A carbon-fiber-reinforced plastic is particularly suitable. The use of fiber-reinforced plastic increases the specific rigidity of the device.

Figure 4B:
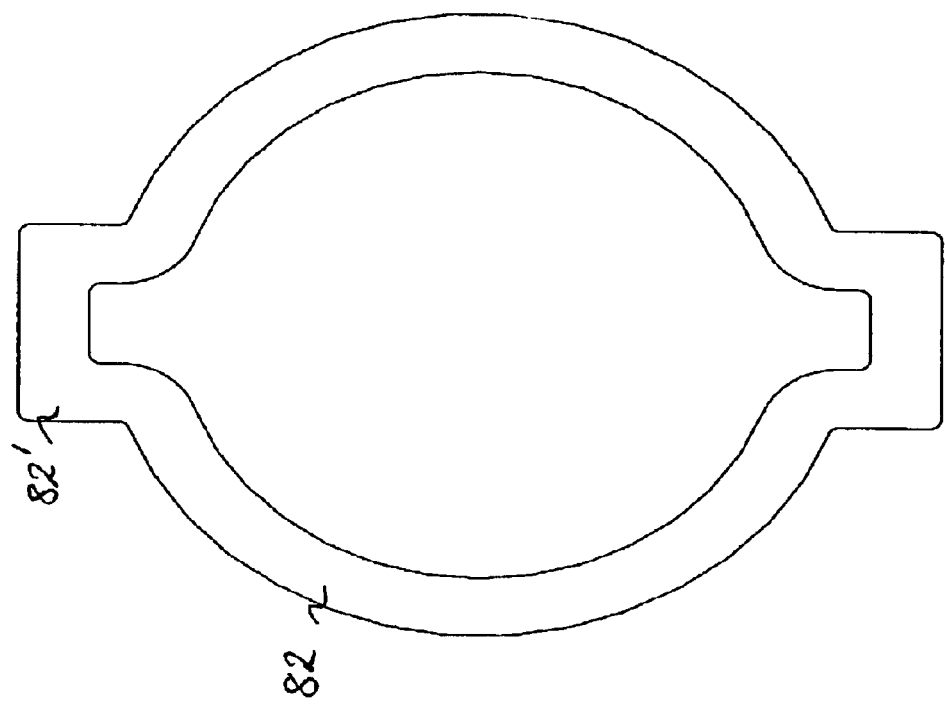
FIG. 4b shows a cross section through an oval bar.
Figure 4A:
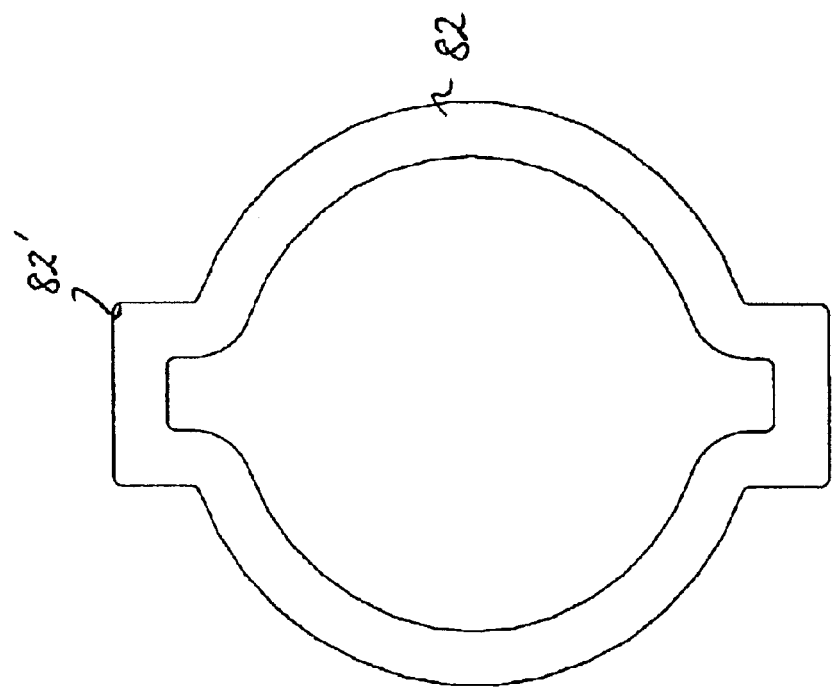
FIG. 4a shows a cross section through a round bar.

In order to ensure the rotationally fixed mounting, the bars 82, 83 have a non-circular cross section. The cross section has at least one outwardly projecting nose 82', 83', it being possible for the basic shape to be round, as can be seen in FIG. 4a. However, in addition to the nose 82', 83', it is preferably also of an oval basic shape, as illustrated in FIG. 4b. Two noses 82', 83' are preferably provided, these being arranged diagonally opposite one another and each extending, in the form of a wedge profile, over at least more or less the entire length of the bar 82, 83. It is also possible, however, to provide a plurality of noses which are distributed in a circularly symmetrical manner over the circumference.

It is preferable for the bars 82, 83 and the slide-bearing elements 84, 85, and in this case also the cardan joints 80, 81, to be of identical construction, with the result that a completely symmetrical arrangement is produced. It is also possible, however, to use different elements. In particular, the bars 82, 83 may be of different lengths.

The slide-bearing elements 84, 85 are of prismatic, and thus relatively short, design. It is preferable for their entire length, which also corresponds to the length of the bearing formed by them, to be at least more or less equal to the diameter of the bars 82, 83 passing through them. It is also the case that the bars 82, 83 are spaced apart from one another by a relatively small distance. The latter is preferably at least more or less equal to the cross section of a bar 82, 83.

The device according to the invention allows precise torque transmission, but is nevertheless of straightforward construction, has a high bending strength and relatively low weight and can easily be cleaned by being washed down.

| List of designations | |
|---|---|
| 1 | Basic element |
| 2 | Axis |
| 20 | Servomotor |
| 21 | Angle transmitter |
| 22 | Monitoring and control unit |
| 3 | Control arm |
| 30 | Free end |
| 4 | Connecting element |

-continued

List of designations

| | |
|---|---|
| 40 | Top transverse rod |
| 41 | Connecting rod |
| 42 | Bottom transverse rod |
| 43 | Top articulation head |
| 44 | Bottom articulation head |
| 5 | Carrier element |
| 6 | Gripping element |
| 7 | Pneumatic suction apparatus |
| 70 | Connecting ring |
| 71 | Hose |
| 72 | Valve |
| 73 | Vacuum pump |
| 8 | Changeable-length fourth axis |
| 80 | Bottom cardan joint |
| 81 | Top cardan joint |
| 82 | First bar |
| 82' | First wedge profile |
| 83 | Second bar |
| 83' | Second wedge profile |
| 84 | First slide bearing |
| 85 | Second slide bearing |
| 86 | Through-passage opening |
| 87 | Accommodating opening |
| 88 | First screw |
| 89 | Second screw |
| 9 | Servomotor |
| 10 | Angle transmitter |

What is claimed is:

1. A delta robot for moving an object in three dimensions, comprising
   a basic element;
   a moveable carrier element;
   first motors;
   control arms, moveable by said first motors and each control arm comprising a first end connected to said basic element and a second end connected to said carrier element;
   a gripper element being arranged on said carrier element;
   a second motor with a shaft;
   a changeable-length axle, said axle forming a device for transmitting torque from said second motor to said gripper element, said device comprising
   a first bar;
   a second bar;
   a slide bearing slidably coupling said first and said second bars together such that the first bar extends in a first direction and that the second bar extends in a second direction, wherein said first direction is parallel to and offset from said second direction;
   a first articulation head attached to an end of said first bar and arranged in said first direction, said first articulation head being attached to a shaft of said second motor and a second articulation head attached to an end of said second bar and arranged in said second direction, said second articulation head being attached to said gripper element, whereby said second articulation head is offset from the first articulation head with reference to said first and second directions, and
   wherein the first and second articulation heads are universal joint components.

2. The robot of claim 1, wherein aid changeable-length axle comprises only two bars.

3. The robot of claim 1, wherein wherein an incoming torque is applied to the first articulation head and the second articulation head transmits said torque as an outgoing torque.

4. The robot of claim 1, wherein said slide bearing couples the first and second bars together such that the first and second bars can be displaced parallel to one another in a guided manner.

5. The device as claimed in claim 1, wherein the slide bearing is of a rotationally fixed design.

6. The device as claimed in claim 1, wherein said slide bearing has two slide-bearing elements, each slide-bearing element having a through-passage opening and an accommodating opening, said through-passage opening having one of said two bars passing through it and said accommodating opening accommodating said other bar.

7. The device as claimed in claim 6, wherein ends of said bars are retained in a rotationally fixed manner in said accommodating openings.

8. The device as claimed in claim 7, wherein said cross section of the bars is of oval or round shape, which is provided with at least one outwardly projecting nose.

9. The device as claimed in claim 1, wherein said bars have a non-circular cross section.

10. The device as claimed in claim 9, wherein there are provided two diagonally opposite noses which each extend, in the form of a wedge profile, over at least more or less the entire length of said bar.

11. The device as claimed in claim 1, wherein said slide-bearing elements have bearings of a length which corresponds substantially to the diameter of said bars passing through them.

12. The device as claimed in claim 1, wherein said two bars are spaced apart from one another by a distance which corresponds substantially to said diameter of one bar.

13. The device as claimed in claim 1, wherein said first and second bars are of substantially the same cross section and wherein said first bar has a length that is different than the length of the second bar, and wherein said slide-bearing elements are of identical design.

14. A delta robot comprising at least three control arms operatively connected to a changeable length device for transmitting torque; the device comprising:
   a first bar;
   a second bar;
   a slide bearing slidably coupling said first and said second bars together such that the first bar extends in a first direction and that the second bar extends in a second direction, wherein said first direction is parallel to and offset from said second direction;
   a first universal joint component attached to an end of said first bar and arranged in said first direction, said first universal joint component being attachable to a shaft of a motor for leading in an incoming torque and
   a second universal joint component attached to an end of said second bar and arranged in said second direction, said second universal joint component being attachable to a gripper element for leading out an outgoing torque,
   said second universal joint component being arranged offset from the first universal joint component with reference to said first and second directions.

15. A delta robot comprising at least three control arms operatively connected to a changeable length device for transmitting torque; the device comprising:
   a first bar;
   a second bar;
   a slide bearing slidably coupling said first and said second bars together such that the first bar is parallel to and offset from said second bar;

a first universal joint component attached to an end of said first bar and aligned therewith for leading in an incoming torque and a second universal joint component attached to an end of said second bar and aligned therewith for leading out an outgoing torque such that the second universal joint component is offset from the first universal joint component.

16. A delta robot comprising at least three control arms operatively connected to a changeable length device for transmitting torque; the device comprising:

a first bar having a major axis running in a first direction;

a second bar having a major axis running in a second direction that is parallel to but offset from the first direction;

a slide bearing slidably coupling together the first and second bars so that they are displaced parallel to one another in a guided manner;

a first universal joint component attached to an end of said first bar for leading in an incoming torque and a second universal joint component attached to an end of said second bar for leading out an outgoing torque, wherein the first universal joint component is aligned with the first direction and the second universal joint component is aligned with the second direction so that the first universal joint component arranged offset to the second universal joint component.

* * * * *